July 13, 1965 T. BARABUTES 3,195,016

SHOCK-RESISTANT STRUCTURE

Filed June 14, 1960 6 Sheets-Sheet 1

WITNESSES:

Wm. C. Groome

James T. Young

INVENTOR

Theodore Barabutes.

BY John L. Stoughton

ATTORNEY

July 13, 1965 T. BARABUTES 3,195,016

SHOCK-RESISTANT STRUCTURE

Filed June 14, 1960 6 Sheets-Sheet 4

July 13, 1965 T. BARABUTES 3,195,016

SHOCK-RESISTANT STRUCTURE

Filed June 14, 1960 6 Sheets-Sheet 5

SHOCK-RESISTANT STRUCTURE

Filed June 14, 1960 6 Sheets-Sheet 6

United States Patent Office 3,195,016
Patented July 13, 1965

3,195,016
SHOCK-RESISTANT STRUCTURE

Theodore Barabutes, Morris Township, Morris County, N.J., assignor to Westinghouse Electric Corporation, East Pittsburgh, Pa., a corporation of Pennsylvania Filed June 14, 1960, Ser. No. 36,047
5 Claims. (Cl. 317—99)

This invention relates generally to electrical instruments and is specifically illustrated in connection with a three-phase wattmeter utilizing the Hall effect.

A primary object of this invention is to provide an electrical instrument which will withstand high shock without change in accuracy of the indication such as might occur, for example, on Navy vessels.

Another object of this invention is to provide such an instrument which is extremely compact.

A still further object is to provide such an instrument which has a minimum of moving parts.

A still further object of this invention is to provide for mounting the parts in a manner in which they are least affected by heavy vibrations and yet provide an instrument which is rugged and light in weight.

Other objects of this invention will be apparent from the description, the appended claims and the drawings, in which drawings:

Figure 1:
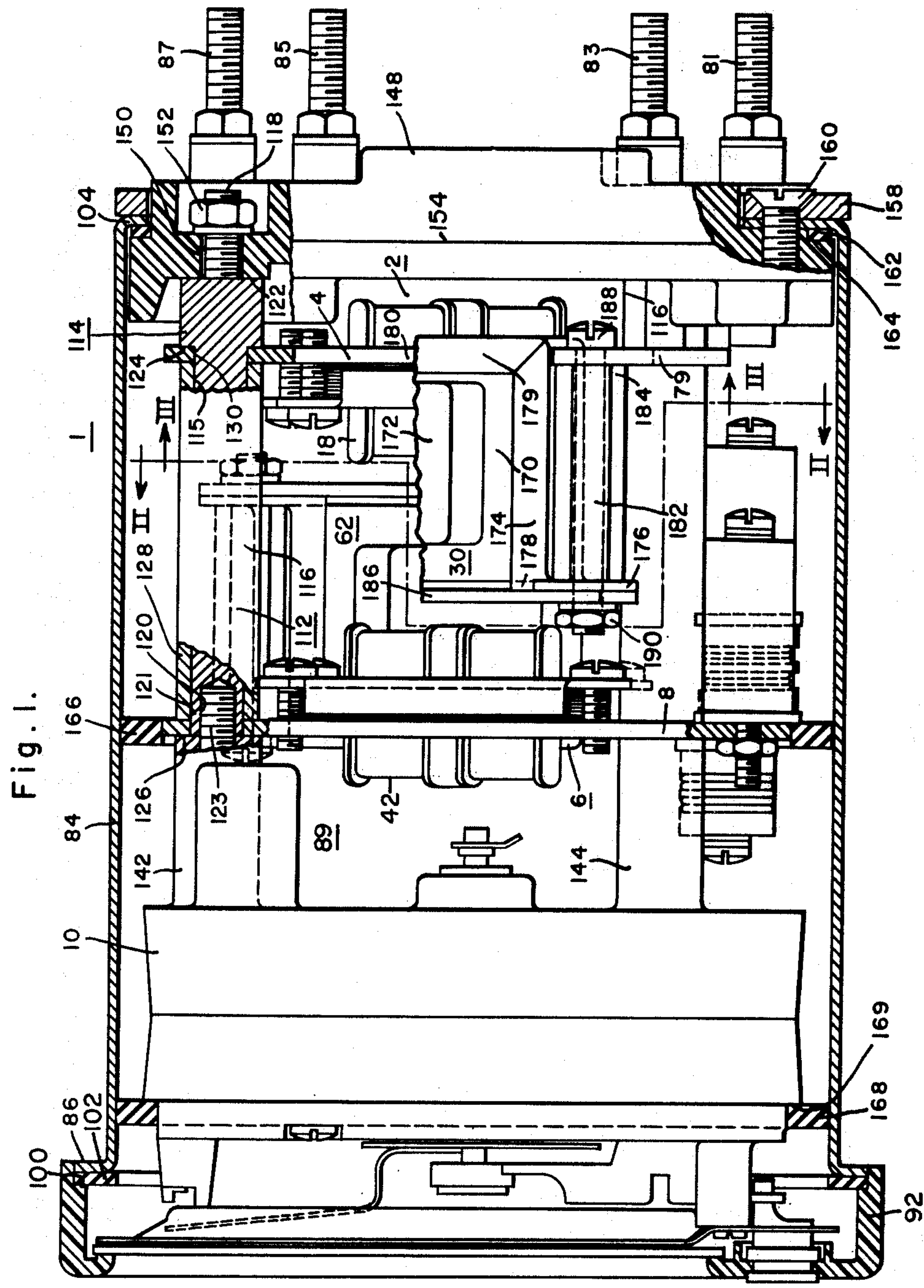
FIGURE 1 is a side view in partial section of a wattmeter-type instrument embodying the invention.
Figure 10:
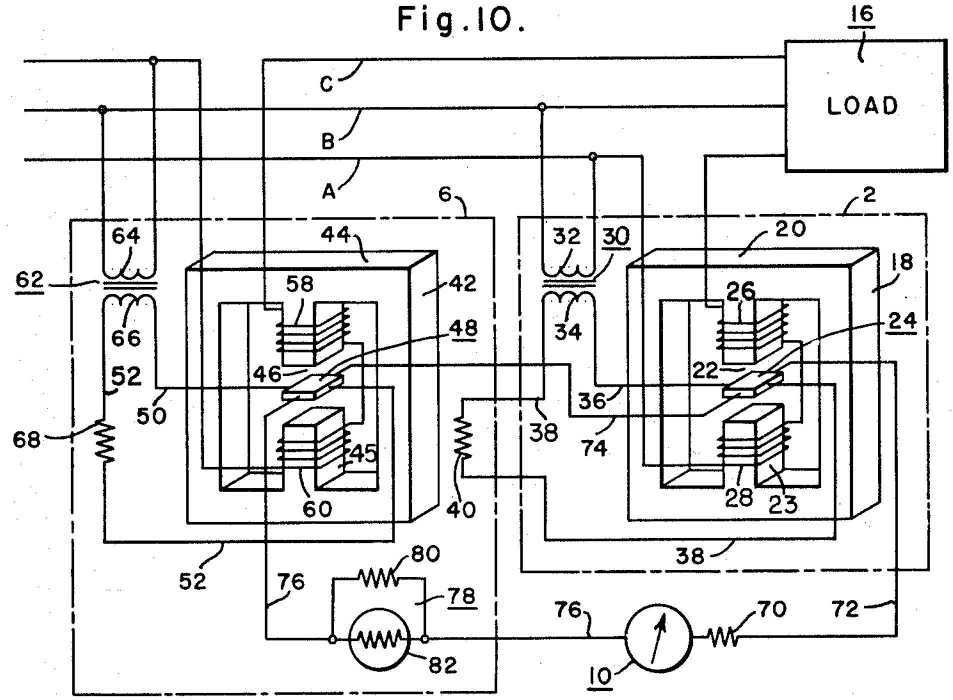
FIG. 10 is a schematic wiring diagram showing the instrument connections when connected to a three-phase supply line.

Referring to the drawings by characters of reference and particularly to FIG. 1, the numeral 1 indicates generally an instrument which, as shown, is an instrument for measuring three-phase power and comprises a first power measuring assembly or unit 2 carried on a first plate-like or disk-like support member 4 and a second power measuring assembly or unit 6 carried on a second disc-like supporting member 8. The power responsive units, as shown, are electrically connected to energize a suitable translating device 10 which, as illustrated, may be a taut band suspension instrument such, for example, as shown in patent application Serial No. 761,899, filed September 18, 1958, and assigned to the same assignee as in this application, now U.S. Patent No. 3,111,623 dated November 19, 1963. The device 10 may be provided with an indicating pointer 12 cooperating with suitable indica 14 to indicate a measured quantity. In the shown instance, the pointer 12 indicates the power being supplied to a three-phase load 16 as will be more particularly pointed out hereinafter and as is schematically illustrated in FIG. 10. It will be appreciated that other types of devices which are to be energized with a quantity proportional to power could be substituted for the device 10 or the device 10 could be omitted entirely and the output of the units 2 and 6 used to energize an external circuit such as a computor, a telemetering transmitter, control amplifier, etc.

Figure 3:
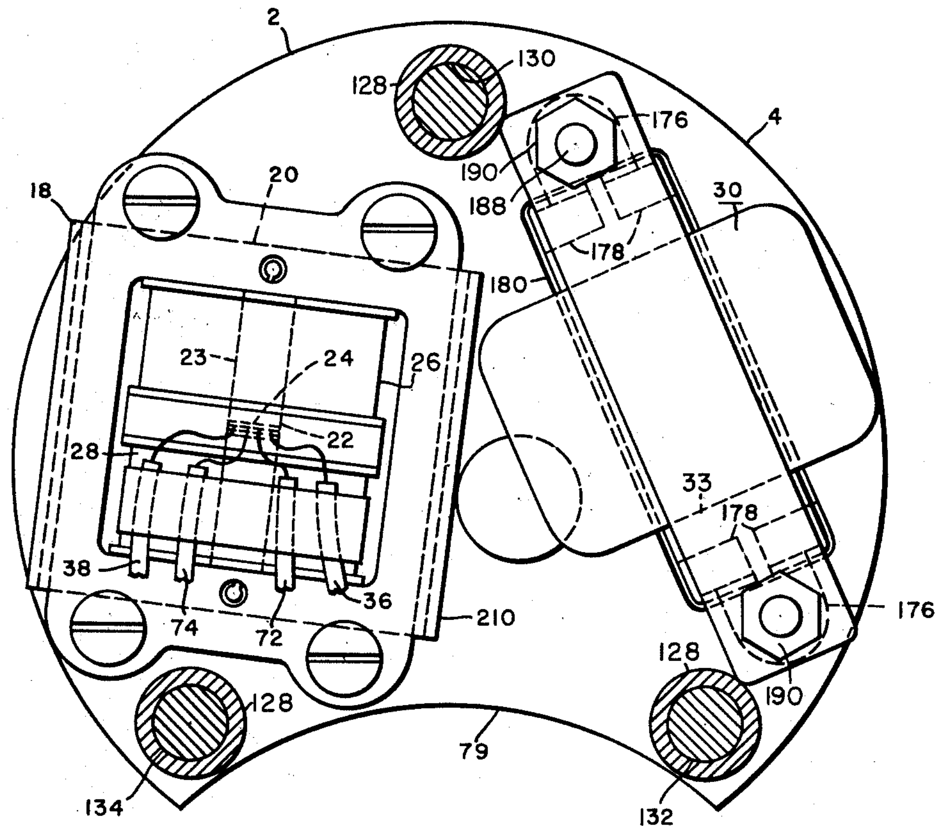
FIG. 3 is a view taken substantially along the line III—III of FIG. 1 and looking in the direction of the arrows.

The assembly or unit 2 (FIG. 3) comprises a first electrical unit which is illustrated as being a Hall device 18 which is schematically shown in FIG. 10 and comprises a laminated core structure 20 having a flux gap 22 in a center flux leg 23. A Hall plate 24 is located in this gap 22. Flux is caused to circulate through the laminated core structure 20 and across the flux gap 22 by means of a pair of windings 26 and 28 which are connected, as shown in FIG. 10, in series with each other and with the phase conductor A which supplies current to the load 16. Current proportional to the voltage between phase conductors A and B is supplied to the Hall plate 24 through a second electrical unit or device which is illustrated as being an isolating transformer 30 having a primary winding 32 connected between the phase conductors A and B and a secondary winding 34 connected by the conductors 36 and 38 to the input terminals of the Hall plate 24. A current regulating resistor 40 is connected in the conductor 38. As shown in FIG. 3, the windings 32 and 34 are located in a winding aperture 33.

Figure 2:
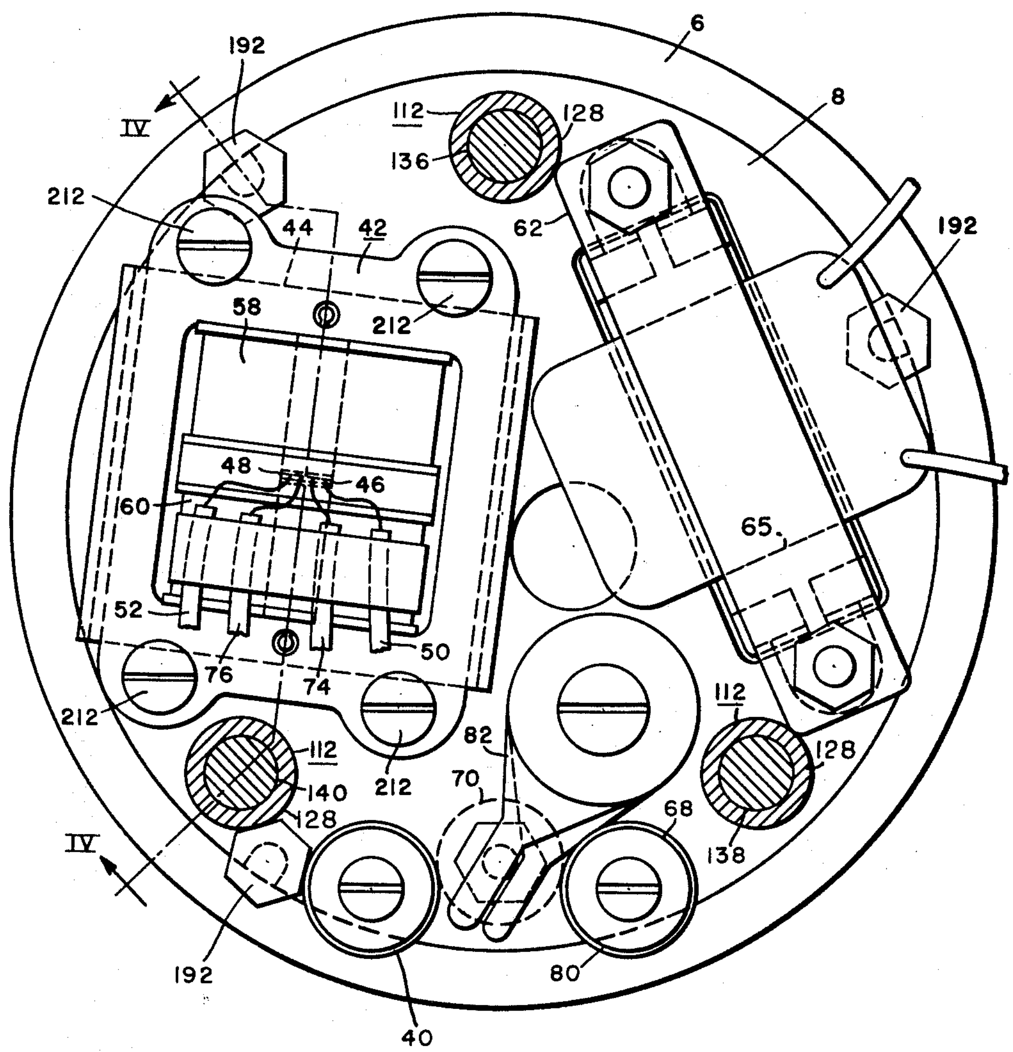
FIG. 2 is a view taken along the line II—II of FIG. 1 and looking in the direction of the arrows.

Similarly, the second power responsive assembly or unit 6 comprises a first electrical unit which is illustrated as being a Hall device 42 having a laminated core structure 44 provided with a center leg 45 having a flux gap 46 in which is positioned a Hall plate 48. Flux is caused to circulate in the core structure 44 and across the flux gap 46 by means of a pair of windings 58 and 60 which are series connected with respect to each other and are connected in series with the phase conductor C. A second electrical unit or device which is illustrated as being an isolating transformer 62 has its primary winding 64 connected between the phase conductors B and C. Its secondary winding 66 is connected by means of the conductors 50 and 52 to the Hall plate 48. A current regulating resistor 68 is connected in the conductor 52. As shown in FIG. 2, the windings 64 and 66 are located in a winding aperture 65.

One terminal of the translating device 10 is connected through a calibrating resistor 70 and a conductor 72 to an output connection of the Hall plate 24. The other output terminal of the Hall plate 24 is connected by means of a conductor 74 to one of the output terminals of the Hall plate 48. The other output terminal of this Hall plate is connected by a conductor 76 through a compensating network 78 to the other terminal of the translating device 10 whereby the translating device 10 is energized in accordance with the sum of voltages appearing across the Hall plates 24 and 48.

Since each Hall device has an output potential which is proportional to the product of the flux flowing transversely through its Hall plate and of the current flowing between the input terminals of the Hall plate, it will be apparent that the translating device 10 is energized with a quantity which is proportional to the total watts flowing through the phase conductors A, B and C to the load 16.

As is more particularly shown in FIG. 3, the unit 2 comprises a disc-like supporting member 4 upon which is mounted the Hall device 18 and the isolating transformer 30. The second power responsive unit 6 shown in detail in FIG. 2 also comprises a plate like or disc-like supporting member 8 upon which is mounted the Hall device 42 and the isloating transformer 62. The units 2 and 6 are substantially identical except that the unit 2 includes an arcuate cutaway portion 79 to provide clearance for the terminals 81 and with this exception what is said about one thereof is applicable to the others thereof. The unit 6 unlike the unit 2 carries the resistors 40, 68, 70 and the network 78. The network 78 comprises a resistor 80 and the thermistor 82 mounted on separate spools as shown most clearly in FIGS. 1 and 2.

Figure 8:
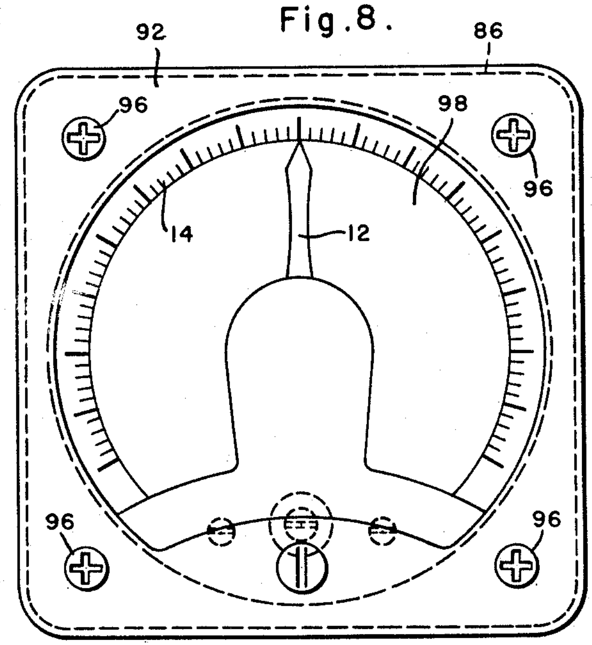
FIG. 8 is a front view of the instrument.
Figure 9:
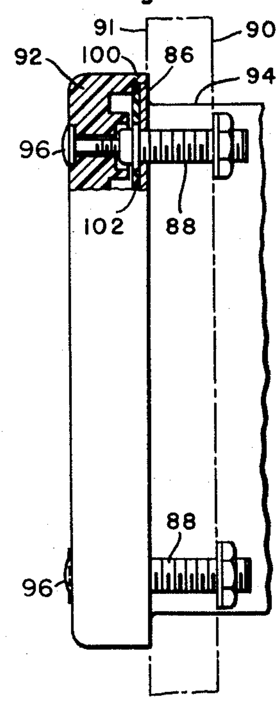
FIG. 9 is a partial side view of FIG. 8 showing the manner of attaching the instrument to a control panel.

The power responsive units 2 and 6 and the translating device 10 are mechanically secured together to form a single unit or responsive device 89 as will be described below. This unit is then mounted within a drawn tubular elongated cylindrical casing 84 which has a somewhat larger internal diameter than the external diameter of the plate's disc-like supporting members 4, 8 and the translating device 10 and has first and second end portions. The forward end portion of the casing 84 is provided with an outturned flange 86 which, as shown in FIG. 8, is rectangular and which has secured thereto, one in each of its four corners, mounting screws 88, FIG. 9, which serve to mount and hold the instrument 1 against the front surface 91 of an instrument mounting panel or supporting member which may be mounted vertically, a fragment of which is shown and identified by the numeral 90. The open end of the casing 84 adjacent the device 10 is closed by a cover 92. The cover 92 is provided with a preipheral internal shoulder 100 which seats against a gasket 102 to seal the casing 84 and thereby protect the units 2 and 6 and device 10 from contamination. The cover 92 is held by screws 96 which thread into internally threaded apertures in the mounting screws 88. The main body portion of the casing 84 extends through an aperture 94 in the panel 90 where it is accessible for connecting wires to its sets of wiring terminals 81, 83, 85 and 87, FIG. 1. The casing cover 92 is provided with a transparent window 98 through which the pointer 12 and indicia 14 may be viewed, FIG. 8.

Figure 6:
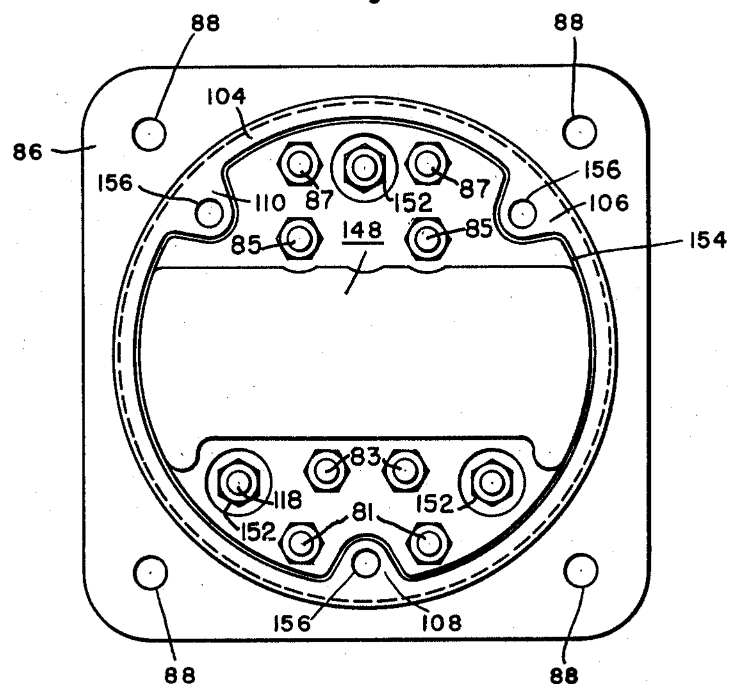
FIG. 6 is a rear end view of the instrument with the mounting ring and its attaching screws removed.

The drawn tubular cylindrical casing 84 at its second or opposite end portion is provided with an inturned flange 104, FIGS. 1 and 6, which is provided with three spaced inturned ears 106, 108, 110 extending inwardly from the inturned flange 104. The flange 104 and ears 106, 108, 110 have surfaces which face inwardly into the interior of the casing and surfaces which face outwardly of the casing. The flange and ears form the sole mounting means by which the unit 89 comprising the units 2 and 6 and the translating device 10 is attached to the casing 84.

The first and second assemblies or units 2 and 6 are assembled with their corresponding sides facing each other, see FIGS. 1, 2 and 3, and rotatively arranged relative to each other such that the transformer 62 aligns with the Hall device 18 and the transformer 30 aligns with the Hall device 42. With this arrangement, the units may be located with minimum spacing therebetween.

The units 2 and 6 are rigidly assembled together by suitable mounting means illustrated as comprising three post structures 112. As best shown in FIG. 1, each structure 112 includes a post 114 having a circularly cylindrical portion 115, an enlarged hexagonal head portion 116 at one end portion of the portion 115, and a reduced diameter externally threaded stud 118 at the opposite side of the head portion 116 from the cylindrical portion 115. The end portion 121 of the post 114 away from the stud 118 is provided with an internally threaded outwardly opening aperture 120 which receives an attaching screw 123 as will be explained below. A first shoulder 122 is formed intermediate the stud 118 and the hexagonal portion 116 and a second shoulder 124 is provided between the hexagonal portion 116 and the cylindrical portion 115. A hollow circularly cylindrical spacing sleeve 128 surrounds the cylindrical extending portion 115 and is shorter than the length of the cylindrical portion 115 by slightly less than the sum of the thicknesses of the members 4 and 8.

The post portion 115 is inserted through an aperture

130 in the supporting member 4 with the member 4 abutting against the shoulder 124. Similarly, the portions 115 of the other post structures 112 are inserted individually through the other two apertures 132 and 134, FIG. 3, of the supporting member 4. Sleeves 128 are thereupon assembled over the portions 115 such that their end portions abut against the supporting member 4. Thereafter, the unit 6 is assembled by inserting the end portions 121 through apertures 136, 138 and 140, FIG. 2, of the disc-like supporting member 8.

In many instances it may be desirable in the fabrication of the instrument 1 to perform certain operations on the units 2 and 6 before they are assembled to the device 10. In such instances, the units 2 and 6 may be temporarily connected together by means of temporary screws threaded within the outwardly open apertures 120 with heads of a diameter suitable to seat against the adjacent surface of the member 8. Subsequently, the device 10 may be assembled to the subassembly by removing the temporary screws and inserting the screws 123. For this purpose, the device 10 is provided with three depending legs 142, 144 and 146, FIGS. 1 and 5, which align respectively with the post structures 112 and which depending legs have apertures extending therethrough through which extend the securing screws 123 and which legs have end surfaces of sufficient size to seat against the adjacent face of the member 8.

A base member 148, FIGS. 1 and 6, preferably of insulating material, is provided with a plurality of apertures 150 through which the studs 118 of the post extend. Nuts 152 are threaded upon the studs 118 and hold the base member 148 solidly against the shoulders 122. The terminals 81, 83, 85 and 87 extend through apertures in the base member 148 and have protruding portions for connection to external circuits and internal portions for connection to the internal circuits of the instrument 1.

Figure 7:
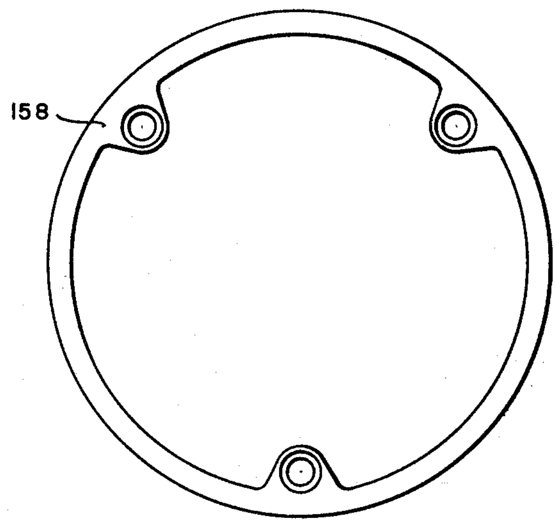
FIG. 7 is a view of the mounting ring.

The base member 148 is also provided with an outwardly facing shoulder 154 which has a contour corresponding to and which seats against the internal flange 104 and its ears 106, 108 and 110, as best shown in FIG. 6. The shoulder 154 is provided with threaded apertures which align with apertures 156 in the ears 106, 108, and 110. A clamping ring or reinforcing member 158 of substantially the shape and size of the internal flange 104 and its ears 106, 108 and 110 (FIG. 7) seats against the outside face of the flange 104 (FIG. 1) and is provided with countersunk apertures which align with the apertures 156. Flat headed screws 160 extend through the apertures in the clamping ring 158 and the ears 106, 108 and 110 and thread into the threaded apertures of the shoulder 154 and serve as clamping means to secure the device 89 to the casing 84. A gasket 162 is positioned between an annular shoulder 164 on the base member 148 and the inner surface of the inturned flange 104 to seal the instrument against ingress of foreign material when the screws 160 are tightly set.

Figure 4:
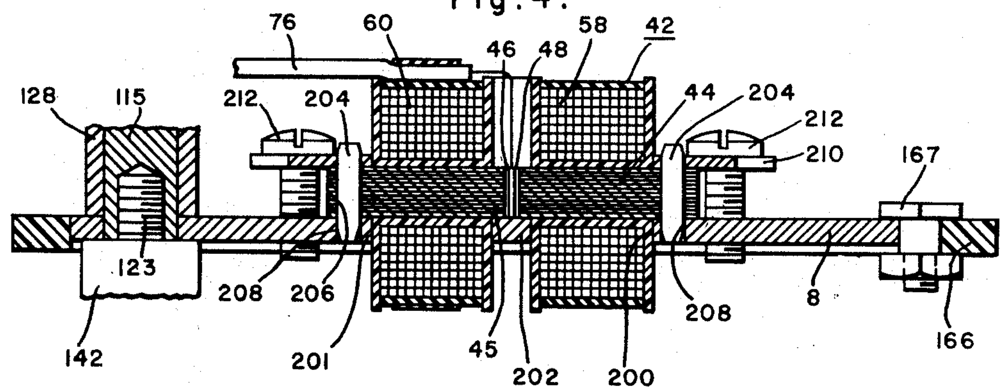
FIG. 4 is a view taken substantially along the line IV—IV of FIG. 2, and looking in the direction of the arrows.
Figure 5:
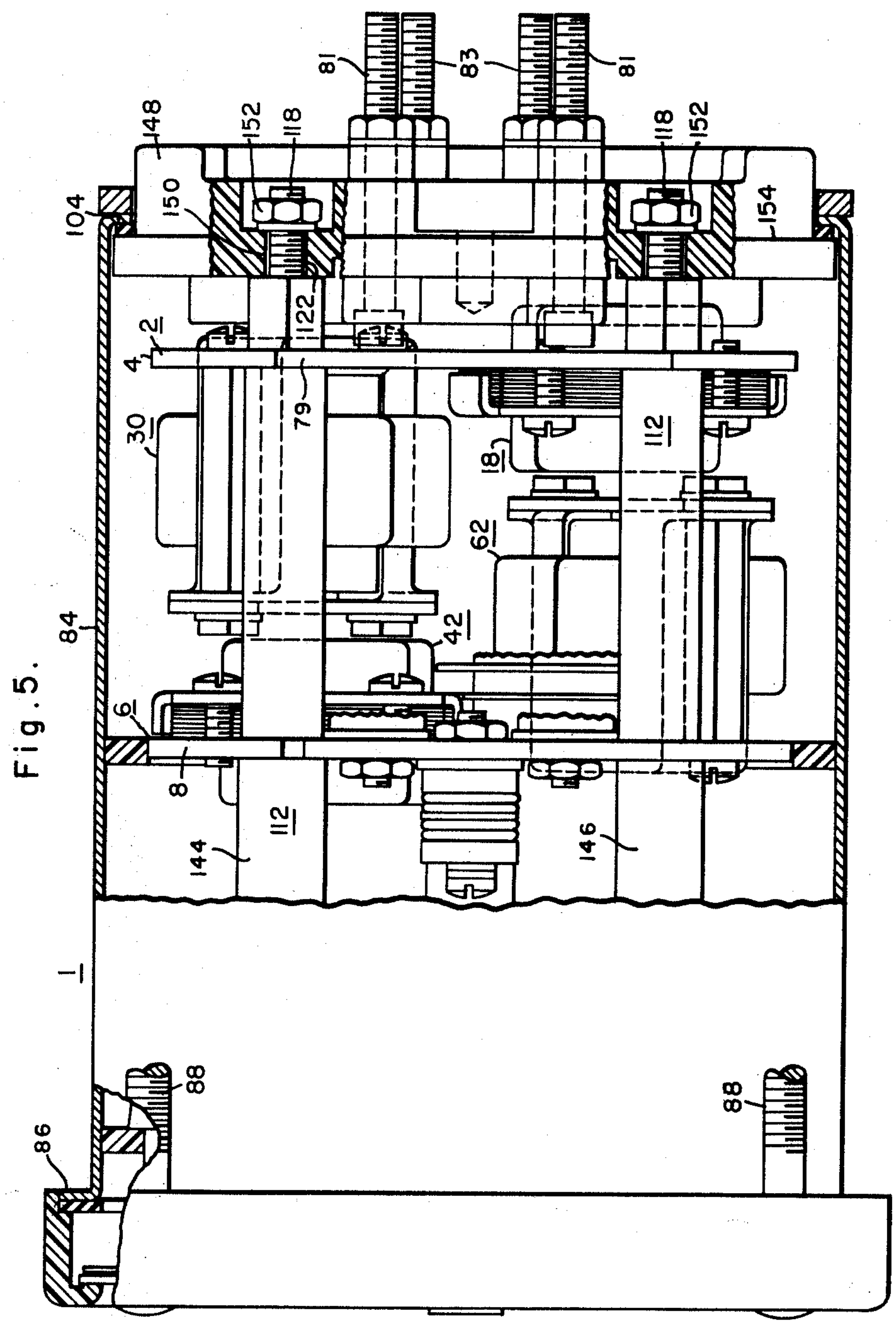
FIG. 5 is a view similar to FIG. 1, but taken with the instrument rotated 90° from the position shown in FIG. 1.

Bumper members shown as rings 166 and 168, FIGS. 1 and 5, are provided to snugly but loosely fit within the interior of the cylindrical casing 84 and snugly but loosely surround or encircle the periphery of the disc-like supporting member 8 and the translating device 10. The ring 166 is held in place by means of the shouldered bolts 167 (FIG. 4). The ring 168 is held against the shoulder 169 of the device 10 in a similar manner by means of shouldered screws (not shown). The construction by which the inner units are secured to the end portion of the drawn tubular cylindrical casing 84 provides a very lightweight and strong arrangement which will withstand a considerable amount of shock such as occurs when large guns are fired on a warship. When this occurs, the instrument interior tends to move longitudinally in the casing 84 and with applicant's construction this movement is prevented and the instrument remains intact even when guns of the largest caliber are fired. The construction by which the transformer is secured to the supporting member is also of paramount importance and is unusual in character.

The transformer 30 as shown in FIGS. 1 and 3 is generally of conventional construction but is secured to the member 4 in a new and improved manner. Transformer 30 comprises a plurality of laminations having a peripheral portion defining a hollow central portion or winding aperture 33 across which extends a central leg (not shown). The coil 172 surrounds this central leg. The laminations 170 may be of many forms but the E–I stacked array may be used to permit ease in the placing of the coil 172 on the center leg. The laminations are held together by a U-shaped channel member 174 which extends peripherally about three sides of the laminations 170. The base portion of the channel member 174 terminates in a pair of oppositely extending supporting flanges or feet portions 176 which, as shown, extend outwardly from the adjacent sides and which lie substantially in the plane of the fourth side. The end portions of the side walls of the member 174 are folded inwardly to provide inturned ears 178 which seat upon the fourth peripheral surface of the laminations 170. The portion 179 of the transformer 30 opposite to the feet 176 fits within an aperture 180 and is held thereby against undesired motion. In other words, a portion of the transformer 30 is positioned within the aperture 180 so that motion limiting means is provided to hold the transformer 30 in the desired manner when the instrument is subjected to a shock or a jar. The feet or support portions 176 are supported in spaced arrangement with respect to the disc member 4 on post structures 182 which extend between the disc member 4 and each of the feet 176.

The post structures or supporting means 182 each comprise a hollow hexagonal spacing sleeve 184 which has one end seating against the disc member 4 and its other end seating against one of the feet 176. The sleeves 184 are engageable with the adjacent portions of the channel member 174 to limit endwise movement of the transformer 30. A reinforcing plate member 186 overlies the opposite faces of the feet 176 from the surfaces which engage the post structures 182. A bolt 188 extends through aligned apertures in the supporting member 4, the feet 176, the reinforcing plate member 186, and the hollow cylindrical sleeve 184 with its head engaging the outer surface of the disc member 4. A securing means in the form of a nut 190 screw threaded to the bolt 188 clamps these elements together. The length of the post structure 182 is preferably such that the transformer portion 179 is located within the aperture 180 and extends only slightly beyond the opposite face of the member 4.

The Hall device 18 is mounted on the member 4, FIG. 3, in the same manner as the device 42 is mounted on the member 8, FIG. 2. The mounting of the device 42 is clearly shown in FIG. 4. The laminated structure 44 is located entirely on the side of the member 8 which faces the member 4. As shown, the windings 58 and 60 project outwardly of the structure 44 and through apertures 200 and 201 which are separated from each other by a narrow dividing wall 202 which extends transversely of the center leg 45 and underlies the gap 46 and serves to support the leg 45. The material used for the members 4 and 8 is non-magnetic and hence does not tend to form a shunt circuit for the flux around the gap 46.

Preferably, the structure 44 carries a pair of locating pins or dowels 204 which are press fitted within apertures 206 in the structure 44 whereby the dowels 204 hold the laminations of the structure 44 together. The dowels 204 extend outwardly of the structure into locating holes 208 for locating the device 42 on the member 8. The dowels 204 extend outwardly of the structure 44 in the opposite direction for locating a coverclamp 210 which seats against the outwardly facing surface of the structure 44 and has a central aperture through which the coils or windings 58 and 60 extend. The conductors 50, 52, 74 and 76 also extend through this central aperture. Four screws 212 extend loosely through apertures in the coverclamp 210 and threadedly engage the member 8 to clamp the Hall device 42 to the member 8. The device 18 is similarly constructed and held to the member 4.

It will be appreciated that with my construction the instrument may be subjected to a considerable amount of shock without having the transformer 30 bend about its feet or otherwise become deformed even though the channel member 174 is made of relatively light material. Likewise the Hall devices 18 and 42 are securely held and will withstand considerable shocking.

What is claimed and is desired to be secured by United States Letters Patent is as follows:

1. In an electrical instrument, a plate-like supporting member, a transformer substantially in the form of a rectangular parallelepiped and having a front and back surface, and end and side surfaces extending between said front and back surfaces, said transformer having a winding aperture opening outwardly of front and back surfaces, said transformer having feet portions extending outwardly from said side surfaces and lying substantially in the plane of one of said end surfaces, said supporting member having an aperture extending therethrough and of a size and shape to receive the other of said end surfaces, a first post structure extending between one of said feet portions and said supporting member and engageable with the adjacent one of said side surfaces, a second post structure extending between the other of said feet portions and said supporting member and engageable with the adjacent one of said side surfaces, a plate-like reinforcing member juxtaposed with respect to said feet and said one end surface, and means securing said reinforcing member and said feet and said post structures and said supporting member together.

2. In an electrical apparatus for mounting on a vertically extending supporting member, an elongated cylindrical casing having first and second end portions, means on said casing adjacent said first end portion for securing said casing to said supporting member with the axis of said cylindrical casing extending in a first direction, said casing being provided with an inturned flange adjacent said second end portion and having an inwardly facing surface and an outwardly facing surface, a responsive device located within and extending from said casing second end portion substantially to said casing first end portion, said responsive device having a base member adapted to seat against said inwardly facing surface of said inturned flange and having a second supporting member spaced from said base member toward said casing first end portion, a first reinforcing member seating against said outwardly facing surface of said inturned flange, clamping means for clamping said base member and said first reinforcing member against said inturned flange, said device second supporting member having an outer peripheral surface, an annular bumper member encircling said outer peripheral surface and having outer portions engageable with said casing, said second supporting member having an aperture therethrough, said aperture having spaced side edges and spaced end edges, an electric device having first and second end portions spaced from each other, said first end portion being located within said aperture and substantially fitting between said aperture edges, said second end portion being spaced outwardly of said second member, a pair of outwardly extending supporting feet on said electric device adjacent said second end portion, a pair of post-like structures, said structures individually extending between said feet and said second member, a second reinforcing member seating against said second end portion of said electric device and against said feet, and means tightly securing together said second reinforcing member and said feet and said second supporting member.

3. A polyphase instrument for mounting an instrument panel subject to shocking loads comprising a circularly cylindrical hollow casing having an outturned flange at a first end portion thereof and an inturned flange at a second end portion thereof opposite to said first end portion, means carried by said outturned flange and adapted to secure said casing to said panel, an assembled apparatus extending between said end portions and having a supporting base, said base having a seating surface of a configuration and area to seat against the internal surface of said inturned flange, a ring-like reinforcing member seating against the external surface of said flange, clamping means extending between said base and said ring-like member for tightly clamping said base and said ring-like member to said inturned flange, a first electrical responsive unit, said unit including a substantially circular disc member, a transformer and a Hall device carried by said disc member, said transformer having a core member with first and second end surfaces, said transformer having outwardly extending feet forming outward extensions of said first end surface, a pair of post-like structures carried by and extending outwardly of said disc member, means securing one end portion of each said structure to said disc member, a plate-like reinforcing member seating against said first end surface and against said feet, means securing said plate-like reinforcing member against said feet and said feet against said post-like structures, said second end surface of said transformer being located closely adjacent said disc member, means limiting lateral movement between said second end surface and said disc member, said Hall device being carried by said disc member adjacent said transformer and extending outwardly from the same side of said disc member as said transformer, said Hall device extending outwardly a lesser distance than said transformer, a second said unit substantially identical to said first unit and having a transformer and a Hall device, means securing said units in face-to-face relationship with said transformer of said first unit extending outwardly of said first unit disc member toward said Hall device of said second unit and said transformer of said second unit extending outwardly of said second unit disc member toward said Hall device of said first unit, means securing said second unit to said base member with said second unit located intermediate said first unit and said base member, a controlled device carried by said first unit and spaced thereby from said second unit, and a bumper ring encircling said disc member of said first unit and cooperable with said casing to limit movement of said first unit transversely of said casing.

4. In an instrument of the character described, a plate-like supporting member having an aperture, an electrical unit having spaced end portions, said unit having a support portion adjacent one of said end portions, supporting means carried by said supporting member and having a unit supporting portion spaced from said supporting member, said aperture being sized to receive the other of said end portions, said unit being positioned relative to said supporting means with its said support portion in juxtaposition with said unit supporting portion and a second portion of said unit positioned in said aperture, means securing said support portion of said unit to said unit supporting portion, said aperture having first and second spaced edge portions between which said second portion is located, the dimension between said edge portions closely approximating the dimension of the part of said second portion of said unit which is located between said edge portions to provide abutments which limit movement of said second portion of said unit to an amount which prevents permanent bending of said support portions of said unit.

5. The combination of claim 4 in which said support portion comprises outwardly extending feet, a reinforcing member seating against said feet and the end surface of said unit at its said one end portion, said securing means clamping said feet between said reinforcing member and said unit supporting portion of said supporting member, said first edge portion being located on one side of a plane extending through said feet and through said aperture, said second edge portion being located on the side of said plane opposite to said one side.

References Cited by the Examiner

UNITED STATES PATENTS

| | | | |
|---|---|---|---|
| 2,043,904 | 6/36 | Pierce | 317—99 |
| 2,162,329 | 6/39 | Dillman | 317—99 |
| 2,201,344 | 5/40 | Paulson | 317—99 X |
| 2,636,128 | 4/53 | Vance | 317—99 X |
| 2,640,099 | 5/53 | Hull | 317—99 X |
| 2,760,124 | 8/56 | Glassburn | 317—105 |
| 2,796,559 | 6/57 | Feucht | 317—99 X |
| 2,832,012 | 4/58 | Kleason et al. | 317—99 X |

LARAMIE E. ASKIN, *Primary Examiner.*

LLOYD Mc COLLUM, JOHN F. BURNS, *Examiners.*